United States Patent Office 3,655,590
Patented Apr. 11, 1972

3,655,590
POLYURETHANE FOAMS PREPARED FROM
STARCH-BASED POLYETHER POLYOLS
Philip H. Moss and Michael Cuscurida, Austin, Tex., assignors to Jefferson Chemical Company, Inc., Houston, Tex.
No Drawing. Filed June 29, 1970, Ser. No. 50,901
Int. Cl. C08g 22/46, 22/14; C08b 19/06
U.S. Cl. 260—2.5 AS                 4 Claims

ABSTRACT OF THE DISCLOSURE

A low cost, easily prepared rigid polyurethane polyol of low viscosity may be made by reacting corn starch with glycol ethers and alkoxylating the product. The polyol may be used to prepare high quality rigid polyurethane foam. Rigid polyurethane foam is an excellent heat insulator and structural material.

BACKGROUND OF THE INVENTION

Field of the invention

This invention pertains to the field of polyurethane chemistry.

Description of the prior art

It is known in the art to use alkylene oxide adducts of glycosides as intermediates for rigid polyurethane foam. However, high cost, high viscosity or processing difficulties have limited the usefulness of these products.

Polyols have been prepared from corn starch reacted with ethylene glycol to form a glycoside which is then alkoxylated to a polyether. However, these products are difficult to make requiring high temperatures and excessive time for stripping the excess ethylene glycol in the glycoside preparation stage. Also, these polyethers are very viscous, 30,000–37,500 centipoises (cps.) and, therefore, difficult to use in rigid foam manufacturing. The process of the invention overcomes these problems and allows low viscosity, 7,500–15,000 cps., starch-based polyols to be made easily.

Polyethers based on methyl glycoside reacted with an alkylene oxide are known in the art, but in the hydroxyl number range necessary for rigid foam manufacture, the methyl glycoside polyethers are very viscous. Also, methyl glycoside is not an economical starting material for urethane polyols.

SUMMARY OF THE INVENTION

The invention is a new starch-based polyol for polyurethane foams, a method for making these polyols using glycol ether of the general formula $R(OCH_2CH_2)_nOH$ to react with starch to form a glycoside which may then be alkoxylated to a polyether polyol, the polyurethane foam made from these polyols, and the method for making the polyurethane foams. By using glycol ethers to form the glycoside, a polyol is made which is easily manufactured, is of low viscosity, and is useful in the manufacture of rigid polyurethane foams of high quality. Thus, the disadvantages of making rigid polyols from starch are overcome by this invention.

DESCRIPTION OF THE PREFERRED EMBODIMENTS

The polyhydroxy polyether polyol of the invention may be prepared by reacting over an acid catalyst with sufficient heat to effect the reaction, one mole of starch (basis anhydroglucose units), preferably corn starch, with from about two to about four moles of a glycol ether of the type $R(OCH_2CH_2)_nOH$ wherein R is an alkyl group of 1 to 4 carbon atoms and n is equal to one or two. The glycoside product of this reaction is then neutralized and stripped of water and excess glycol ether. The glycoside is then alkoxylated to the final polyol over a basic catalyst at a temperature sufficient to sustain the reaction. The alkylene oxide may be ethylene oxide, propylene oxide, or butylene oxide. Propylene oxide is preferred. The hydroxyl number which is desired for the finished polyol will determine the amount of alkylene oxide to react with the glycoside. The hydroxyl number may range from about 300 to about 500 but the preferred range is from about 350 to about 450. The reaction mixture is then neutralized and the water and excess reactants are stripped from the polyol.

In order to form polyurethane foams using the polyols prepared as above described, several other ingredients are essential: first an isocyanate. An isocyanate reacts directly with the active hydrogens of the polyols. The isocyanate may be difunctional such as toluene diisocyanate or the polyfunctional polyaryl isocyanates. These polyaryl isocyanates are produced by the phosgenation of the reaction product of aniline and formaldehyde. Such reactions are well known and described in U.S. Pats. 2,683,-730, 3,277,173, 3,344,162 and 3,362,979, for example. The polyaryl isocyanates thus formed have functionalities greater than two which can be varied up to the higher functionality materials. In practice, however, functionalities greater than four are attained only with difficulty. However, for purposes of practice of our invention, materials with a functionality as high as five may be used. It is preferred that the functionality be from two to about four, and especially preferred that the functionality of the polymethylene polyphenol isocyanate used in the practice of our invention be from about 2.3 to about 3.5.

In the production of polyurethane foams in the practice of our invention, other known additives are necessary. One such constituent is the blowing agent. Some examples of such material are trichloromonofluoromethane, dichlorodifluoromethane, dichloromonofluoromethane, 1,1-dichloro-1-fluoromethane, 1,1-difluoro-1,2,2-trichloromethane, chloropentafluoroethane, and the like. Other useful blowing agents include low-boiling hydrocarbons such as butane, pentane, hexane, cyclohexane, and the like. See U.S. Pat. 3,072,582, for example.

Many catalysts of urethane formation are useful in the practice of our invention. Such catalysts which either may be used alone or in combination with other catalysts are, for example, dimethylaminoethanol, tetramethyl-1,3-propanediamine, triethylenediamine, tetramethyl-1,3-butanediamine, dimethylethanolamine, methyltriethylenediamine, N-methylmorpholine, N-ethylmorpholine, and the like. There are many tertiary amine catalysts which are useful and well known to those skilled in the art both as to the proportion which should be used and the catalyst compounds themselves. The catalyst is employed in catalytic amounts such as from about 0.1 wt. percent to about 6 wt. percent based upon the weight of the polyol.

Surfactant agents, better known as silicone oils, are added to serve as a cell stabilizer. Some representative materials are sold under the names of SF–1109, L–520, L–521 and DC–193 which are, generally, polysiloxane polyoxyalkylene blocked copolymers, such as those disclosed in U.S. Pats. 2,834,748, 2,917,480 and 2,846,458, for example.

Should fire retardancy be required for the polyurethane foam, two types of fire retardants are available: those that are incorporated by mere mechanical mixing and those that become chemically bound in the polymer chain. Representative of the first type are tris(chloroethyl) phosphate, tris(2,3-dibromopropyl) phosphate, diammonium phosphate, various halogenated compounds and antimony oxide. Representative of the chemically bound type are chlorendic acid derivatives, and various phosphorus-containing polyols.

There are two well known methods suitable for the manufacture of the polyurethane foam of this invention—the one shot method and the prepolymer method.

In the one shot method, all of the components are mixed together at once and the reaction is in one step. In the prepolymer method, only a portion of the polyol is initially reacted with the isocyanate to form a so-called prepolymer. When foam is desired the rest of the polyol and the other ingredients are added to this prepolymer and the foam is formed. Both methods have advantages and drawbacks and it is within the understanding of one skilled in the art to select the method most desirable under specific circumstances.

The following examples are designed to illustrate the invention and its advantages without limiting its scope.

Example I illustrates the preparation of three polyols of the invention. Examples II, III, and IV illustrate prior art polyols and the problems involved in their preparation. Example V illustrates the preparation of rigid foams from the polyols like those in Examples I–IV to show that excellent foams may be prepared from the polyols of the invention.

EXAMPLE I

This example will illustrate the preparation of a 398 hydroxyl number propylene oxide adduct of a glycoside prepared by the sulfuric acid-catalyzed reaction of corn starch with ethylene glycol monomethyl ether. Into a ten gallon kettle was charged 15 lb. corn starch, 22.5 lb. ethylene glycol monomethyl ether and 28 g. concentrated sulfuric acid. The reactor was then thoroughly purged with prepurified nitrogen. The reaction mixture was then heated to 125° C. and kept at that temperature for two hours. After cooling to 75° C. the product was neutralized with 17 g. flaked potassium hydroxide. Excess ethylene glycol monomethyl ether and water (20.9 lb. total) were then removed by vacuum stripping to a minimum pressure at 100° C. Approximately two hours were required to strip the excess glycol ether. Potassium hydroxide (151 g.) catalyst was then added and the methoxyethyl glycoside (16.6 lb.) was propoxylated with propylene oxide (28 lb.) at 125–130° C. at 60 p.s.i.g. Approximately two to three hours were required for addition of the propylene oxide. The reaction mixture was then digested to an equilibrium pressure and stripped with nitrogen for one half hour. The alkaline product was then diluted to 60–70% nonvolatiles with water. After filtering through a filter cloth, the aqueous product was passed in sequence through acidic (Amberlite 200) and basic (Duolite 102–D) ion-exchange columns. The product was dewatered by stripping to 110° C. at a minimum pressure and then with nitrogen for one-half hour. The dewatered product was then polish filtered. It had the following properties:

Polyol 1a

| | |
|---|---|
| Acid number, mg. KOH/g. | 2.0 |
| Hydroxyl number, mg. KOH/g. | 398 |
| Water, wt. percent | 0.09 |
| Ash, wt. percent | 0.002 |
| Sodium, p.p.m. | 0.2 |
| Potassium, p.p.m. | 14.3 |
| Viscosity, 25° C., cps. | 7500 |
| pH in 10:6 isopropanol-water | 4.0 |

Using the above procedure, polyethers having hydroxyl numbers of 405 and 423 were prepared by propoxylation of the glycoside from the starch-ethylene glycol monomethyl ether reaction. Charges and polyether properties are shown in the following table:

| Polyol | 1b | 1c |
|---|---|---|
| Charge: | | |
| Corn starch, lbs. | 15 | 15 |
| Ethylene glycol monomethyl ether, lbs. | 22.5 | 22.5 |
| Sulfuric acid, conc., g. | 28 | 28 |
| Potassium hydroxide, flaked, g.: | | |
| For neutralization | 17 | 17 |
| For catalysis | 151 | 141 |
| Propylene oxide, lbs. | 28 | 24 |
| Properties: | | |
| Acid number, mg. KOH/g. | 1.2 | 1.4 |
| Hydroxy number, mg. KOH/g. | 405 | 423 |
| Water, wt. percent | 0.04 | 0.04 |
| Viscosity, 25° C., cps. | 9,400 | 15,000 |
| Ash, wt. percent | 0.015 | 0.7 |
| Sodium, p.p.m. | 137 | 3.6 |
| Potassium, p.p.m. | 4.7 | 4.0 |

EXAMPLE II

This example illustrates the preparation of polyethers by propoxylation of ethylene glycol glycosides. It will further show processing difficulties associated with the preparation of these products and the high viscosities of the finished product.

Into a ten-gallon kettle were charged 22.5 lb. ethylene glycol, 15 lb. corn starch, and 30 g. concentrated sulfuric acid. The reactor was then evacuated and purged with prepurified nitrogen. The reaction mixture was digested one to three hours at 125–130° C. and neutralized at 95° C. with 16.4 g. potassium hydroxide. Water and ethylene glycol were then removed by stripping at 160° C. at minimum pressure. Stripping times ranged from three to six hours in a ten-gallon reactor to 36 hours in a 1000-gallon reactor. Potassium hydroxide (159 g.) catalyst was added and the glycoside was propoxylated (35.16 lb.) at 150–160° C. at 60 p.s.i.g. Approximately two hours were required for addition of the propylene oxide. The reaction mixture was then digested to an equilibrium pressure and stripped with nitrogen for one-half hour. The alkaline product was diluted to 60–70% nonvolatiles with water. Hyflo Supercel (100 g.) and di-t-butyl p-cresol (19 g.) were also added at this time. After filtering, the aqueous product was passed in sequence through acidic (Amberlite 200) and basic (Duolite 102–D) ion-exchange columns. The product was dewatered by stripping to 100° C. at minimum pressure and then with nitrogen for one-half hour. The dewatered product was then polish filtered. The properties were as follows:

Polyol 2a

| | |
|---|---|
| Acid number, mg. KOH/g. | 0.06 |
| Hydroxyl number, mg. KOH/g. | 405 |
| Viscosity, 25° C., cps. | 32,500 |
| Water, wt. percent | 0.02 |
| Sodium, p.p.m. | 1.1 |
| Potassium, p.p.m. | 8.3 |
| Ash, wt. percent | Nil |
| pH in 10:6 isopropanol-water | 6.2 |

Using the above procedure, a 427 hydroxyl number propylene oxide adduct of a starch glycoside was prepared. Charges and polyether properties are as follows:

Polyol 2b

| | |
|---|---|
| Charge: | |
| Ethylene glycol, lb. | 22.5 |
| Sulfuric acid, conc., g. | 30 |
| Corn starch, lb. | 15 |
| Potassium hydroxide, flaked, g. | |
| For neutralization | 16.4 |
| For catalysis | 157 |
| Propylene oxide, lb. | 33.3 |
| Properties: | |
| Acid number, mg. KOH/g. | 0.04 |
| Hydroxyl number, mg. KOH/g. | 421 |
| Viscosity, 25° C., cps. | 36,000 |
| Water, wt. percent | 0.02 |
| Sodium, p.p.m. | 2.8 |
| Potassium, p.p.m. | 4.1 |
| Ash, wt. percent | Nil |
| pH in 10:6 isopropanol-water | 6.9 |

Although propylene oxide adducts of the ethylene glycol glycosides are interesting rigid foam intermediates, there are several difficulties associated with their manufacture and use. Included are the long ethylene glycol stripping times (up to 36 hours in larger equipment) and high temperatures required for stripping (165° C.). The long stripping times offset any advantage in raw material costs. In addition, the high viscosity of the products (32,000–36,000 cps. at 25° C.) in the useful hydroxyl number range (405–421) presents problems in foam manufacture.

EXAMPLE III

Polyethers based on methyl glycoside have been extensively studied as rigid foam intermediates. Although generally satisfactory, several disadvantages are associated with their use. Included are the high cost of methyl glycoside, processing problems, and high viscosity products. The preparation of a typical methyl glycoside polyol can be described as follows:

Into a ten-gallon kettle were charged 31.25 lb. of a 75% aqueous methyl glycoside solution and 227 g. flaked potassium hydroxide. The kettle was then evacuated, purged with prepurified nitrogen, and heated to 125° C. Propylene oxide (7.46 lb.) was then added at 125–135° C. over a 15-minute period. The reaction mixture was then digested to an equilibrium pressure and additional propylene oxide (37.32 lbs.) was added and digested. The product could be neutralized with 85% phosphoric acid or the potassium removed by passage through an acidic ion-exchange column. The product was then dewatered and filtered. Properties of the finished product were as follows:

| | |
|---|---|
| Acid number, mg. KOH/g. | 0.2 |
| Hydroxyl number, mg. KOH/g. | 417 |
| Viscosity, 25° C., cps. | 31,500 |
| Water, wt. percent | 0.04 |
| Ash, wt. percent | Nil |
| Sodium, p.p.m. | 0.4 |
| Potassium, p.p.m. | 1.5 |
| pH in 10:6 isopropanol-water | 4.3 |

EXAMPLE IV

Using the procedure of Example III, a 410 hydroxyl number propylene oxide adduct of an experimental mixture of alpha- and beta-methyl glucosides has been prepared. Charges and product properties are as follows:

Charge:

| | |
|---|---|
| 70.8% aqueous solution of alpha- and beta-methyl glucosides, lb. | 35.3 |
| Potassium hydroxide, flaked, g. | 227 |
| Propylene oxide, step 1, lb. | 7.48 |
| Propylene oxide, step 2, lb. | 37.32 |

Properties:

| | |
|---|---|
| Acid number, mg. KOH/g. | 0.7 |
| Hydroxyl number, mg. KOH/g. | 410 |
| Viscosity, 25° C., cps. | 37,500 |
| Water, wt. percent | 0.03 |
| Ash, wt. percent | 0.002 |
| Sodium, p.p.m. | 0.2 |
| Potassium, p.p.m. | 0.8 |
| pH in 10:6 isopropanol-water | 5.7 |

The high viscosity of this polyol presents an obvious disadvantage to its use in foam preparation.

EXAMPLE V

This example will illustrate the preparation of rigid foams from the polyols described in Examples I–IV. It further shows that foams with good properties can be prepared from polyols derived from the methoxyethyl glycosides of Example I. In addition, this example shows that foams from the polyols of our invention are as good as those derived from Examples II–IV. This is accompanied by the aforementioned advantages in cost, processing, and product viscosity. The tests performed and shown in the tables below on the foams are reported in the American Society for Testing and Materials (ASTM) and the ASTM designations are shown in the tables.

| | Foam Number | | | |
|---|---|---|---|---|
| | 5a | 5b | 5c | 5d |
| Formulation, p.b.w.: | | | | |
| Polyol of Example IB (OH=405) | 41.8 | 33.2 | | |
| Polyol of Example Ic (OH=423) | | | 41 | 32.7 |
| Silicone oil | 0.5 | 0.5 | 0.5 | 0.5 |
| Diethyl bis(2-hydroxyethyl) aminomethane phosphonate | | 8.0 | | 8.0 |
| Dimethylaminoethanol | 0.5 | 0.5 | 0.5 | 0.5 |
| Tetramethyl 1,3-propanediamine | 0.5 | 0.5 | 0.5 | 0.5 |
| Fluorocarbon IIb | 14 | 14 | 14 | 14 |
| Polyaryl isocyanate | 42.7 | 43.3 | 43.5 | 44 |
| Details of preparation: | | | | |
| Cream time, sec. (time to beginning of reaction) | 38 | 20 | 30 | 28 |
| Rise time, sec. | 190 | 150 | 210 | 210 |
| Tack-free time, sec. (time when foam is not sticky to the touch) | 150 | 100 | 160 | 160 |
| Properties: | | | | |
| Density, p.c.f. (ASTM D1622–63) | 1.9 | 1.8 | 1.8 | 1.8 |
| Compressive strength, p.s.i. (ASTM D1621): | | | | |
| Parallel | 34.5 | 30 | 33 | 33 |
| Perpendicular | 11 | 9 | 9.7 | 10.2 |
| Tensile strength, p.s.i. (ASTM D1623) | 50 | 43.6 | 44.4 | 45.9 |
| Burning rate, in./min. (ASTM D1692–28) | [1] 5.5 | 1.4 (33.4) | [1] 5.3 | 1.5 (34.2) |
| K-factor (ASTM C177–63) | 0.136 | 0.132 | 0.132 | 0.128 |
| Dimensional stability (ASTM D2126), 158° F., 100% R.H.: | | | | |
| Δ volume: | | | | |
| 24 hours | 10.4 | 16.8 | 7.0 | 13.0 |
| 1 week | 16.6 | 28 | 13.3 | 21.4 |
| Δ weight: | | | | |
| 24 hours | −10.0 | 2.9 | −1.1 | −1.1 |
| 1 week | −2.4 | −2.9 | −2.3 | −2.6 |
| Δ linear: | | | | |
| 24 hours | 6.8 | 9.0 | | 7.4 |
| 1 week | 10.4 | 14.6 | 8.7 | 12.9 |
| 180° F., dry, 1 week: | | | | |
| Δ V | 5.5 | 5.6 | 6.0 | 4.6 |
| Δ W | −0.5 | −0.1 | 0.1 | 0.2 |
| Δ L | 3.6 | 4.1 | 4.0 | 3.6 |

See footnote at end of table.

TABLE—Continued

| | Foam Number | | | | | |
|---|---|---|---|---|---|---|
| | 5e | 5f | 5g | 5h | 5i | 5j |
| Formulation, p.b.w.: | | | | | | |
| Ethylene glycol glycoside polyether as in Example II (OH=427) | 251 | 220 | | | | |
| Methyl glucoside polyol as in Example IV (OH=407) | | | 251.7 | 188.7 | | |
| Methyl glucoside polyol as in Example III (OH=427) | | | | | 251.7 | 157.2 |
| Diethyl bis(2-hydroxyethyl) aminomethylphosphate | | 30 | | 60 | | 90 |
| Silicone oil | 3.0 | 3.0 | 3.0 | 3.0 | 3.0 | 3.0 |
| Dimethylaminoethanol | 3.6 | 3.0 | 3.6 | 1.8 | 3.6 | 1.6 |
| Tetramethyl 1,3-propanediamine | | 3 | 3.6 | 1.8 | 3.6 | 1.6 |
| Trichloromonofluoromethane | 85 | 85 | 81 | 81 | 81 | 81 |
| Polyaryl isocyanate | 258 | 260 | 257.1 | 260.1 | 257.1 | 261.6 |
| Details of preparation: | | | | | | |
| Cream time, sec | 24 | 28 | 35 | 35 | 22 | 12 |
| Rise time, sec | 130 | 190 | 120 | 180 | 145 | 104 |
| Tack-free time, sec | 140 | 205 | 100 | 180 | 112 | 75 |
| Properties: | | | | | | |
| Density, p.c.f. (ASTM D1622-63) | 2.2 | 2.2 | 2.0 | 1.9 | 2.1 | 1.9 |
| Compressive strength, p.s.i. (ASTM D1621): | | | | | | |
| Parallel | 34 | 35 | 40 | 33 | 42 | 32 |
| Perpendicular | 15 | 15 | 16 | 16 | 17 | 12 |
| Tensile strength, p.s.i. (ASTM D1625) | 49 | 52 | 47 | 53 | 56 | 51 |
| Burning rate, in./min. (ASTM D1692-68) | [1] 7.3 | 1.1 | [1] 6.5 | [2] 1.1 | [1] 4.0 | F.R. |
| K-factor (ASTM C177-63) | 0.113 | 0.111 | | | 0.110 | 0.117 |
| Dimensional stability (ASTM D2126), 158° F., 100% R.H.: | | | | | | |
| Δ volume: | | | | | | |
| 24 hours | 5.4 | 5.1 | 7.1 | 16.7 | 7.4 | 20.1 |
| 1 week | 8.0 | 9.2 | 12.4 | 24.2 | 13.4 | 33.9 |
| Δ weight: | | | | | | |
| 24 hours | −0.4 | −0.5 | −1.5 | −1.6 | −1.7 | −3.0 |
| 1 week | −1.8 | −1.6 | −5.0 | −2.4 | −1.9 | −4.7 |
| Δ linear: | | | | | | |
| 24 hours | 3.9 | 3.4 | 4.3 | 8.8 | 5.1 | 11.7 |
| 1 week | 5.9 | 5.9 | 5.8 | 12.3 | 7.7 | 18.4 |
| 180° F., dry, 1 week: | | | | | | |
| Δ V | 3.3 | 3.5 | 5.5 | 4.7 | 5.6 | 7.4 |
| Δ W | −0.2 | −0.1 | −0.7 | −0.4 | −1.4 | −2.2 |
| Δ L | 2.0 | 2.4 | 5.5 | 5.9 | 3.8 | 4.7 |

[1] Burns.
[2] S.E.

We claim:

1. A polyurethane foam formed by reacting in the presence of a blowing agent
   a polyisocyanate and
   a polyol prepared by reacting starch in a first step with from about 2 to about 4 moles of a glycol ether of the formula $$R(OCH_2CH_2)_nOH$$

per mole of anhydroglucose unit of said starch, wherein R is an alkyl group of 1 to 4 carbon atoms and $n$ is equal to 1 or 2, and then alkoxylating in a second step the glucoside product of the first step to give a polyol having a hydroxyl number of at least 350.

2. The polyurethane foam of claim 1 wherein the glycol ether is $ROCH_2CH_2OH$ and R is an alkyl group of 1 to 4 carbon atoms.

3. The polyurethane foam of claim 2 wherein the glycol ether is $CH_3OCH_2CH_2OH$.

4. The polyurethane foam of claim 3 wherein the alkylene oxide is propylene oxide and the starch is corn starch.

References Cited

UNITED STATES PATENTS

| 3,165,508 | 1/1965 | Otey et al. | 260—210 |
| 3,402,170 | 9/1968 | Fuzesi et al. | 260—233.3 |
| 3,510,471 | 5/1970 | Case | 260—209 |
| 3,505,255 | 4/1970 | Granger et al. | 260—9 |
| 3,541,034 | 11/1970 | Fuzesi et al. | 260—2.5 |

DONALD E. CZAJA, Primary Examiner

H. S. COCKERAM, Assistant Examiner

U.S. Cl. X.R.

260—233.3